United States Patent
Matsumoto

(10) Patent No.: US 11,528,397 B2
(45) Date of Patent: Dec. 13, 2022

(54) LENS APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Toru Matsumoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/207,976

(22) Filed: Mar. 22, 2021

(65) Prior Publication Data

US 2021/0302685 A1   Sep. 30, 2021

(30) Foreign Application Priority Data

Mar. 30, 2020   (JP) .............................. JP2020-059849

(51) Int. Cl.
  *H04N 5/225*   (2006.01)
  *G02B 7/02*   (2021.01)
  *G02B 7/14*   (2021.01)

(52) U.S. Cl.
  CPC .......... *H04N 5/2254* (2013.01); *G02B 7/021* (2013.01); *G02B 7/14* (2013.01); *H04N 5/225* (2013.01)

(58) Field of Classification Search
  CPC .......... G02B 7/021; G02B 7/14; G02B 7/023; H04N 5/225; H04N 5/2254
  See application file for complete search history.

(56) References Cited

U.S. PATENT DOCUMENTS

| | | | |
|---|---|---|---|
| 5,900,992 A | 5/1999 | Kodaka | |
| 2005/0212947 A1* | 9/2005 | Sato | H01L 27/14618 348/340 |
| 2010/0220403 A1* | 9/2010 | Fukino | G02B 7/102 359/823 |
| 2015/0098142 A1* | 4/2015 | Izumi | G02B 7/023 359/817 |
| 2017/0235092 A1* | 8/2017 | Nagaoka | G02B 7/282 359/824 |

FOREIGN PATENT DOCUMENTS

| | | |
|---|---|---|
| JP | H0743593 A | 2/1995 |
| JP | H0943655 A | 2/1997 |
| JP | 2017111315 A | 6/2017 |
| JP | 2019028295 A | 2/2019 |

* cited by examiner

*Primary Examiner* — Abdelaaziz Tissire
(74) *Attorney, Agent, or Firm* — Rossi, Kimms & McDowell LLP

(57) ABSTRACT

A lens apparatus includes an holding barrel configured to hold a lens, movable relative to a fixed barrel in an optical axis direction, and configured to form a retracted state having an overall length of the lens apparatus smaller than when the lens apparatus is in an imaging state, an operating member configured to switch between a lock state that locks the holding barrel and an unlock state that unlocks the holding barrel, a state detector configured to detect a state of the holding barrel relative to the fixed barrel in the optical axis direction, a lock detector configured to detect whether the operating member is in the lock state or the unlock state, and an output unit configured to output detection results by the state detector and the lock detector, or information on whether imaging is available according to the detection results.

13 Claims, 6 Drawing Sheets

| POSITION DETECTOR | LOCK DETECTING SWITCH | IMAGEABILITY | CAMERA DISPLAY |
|---|---|---|---|
| ON | OFF | UNAVAILABLE | UNLOCK AND MAKE IMAGING STATE |
| ON | ON | UNAVAILABLE | MAKE IMAGING STATE |
| OFF | ON | UNAVAILABLE | MAKE IMAGING STATE |
| OFF | OFF | AVAILABLE | NO DISPLAY |

| POSITION DETECTOR | LOCK DETECTING SWITCH | IMAGEABILITY | CAMERA DISPLAY |
|---|---|---|---|
| ON | OFF | UNAVAILABLE | UNLOCK AND MAKE IMAGING STATE |
| ON | ON | UNAVAILABLE | MAKE IMAGING STATE |
| OFF | ON | UNAVAILABLE | MAKE IMAGING STATE |
| OFF | OFF | AVAILABLE | NO DISPLAY |
FIG. 6
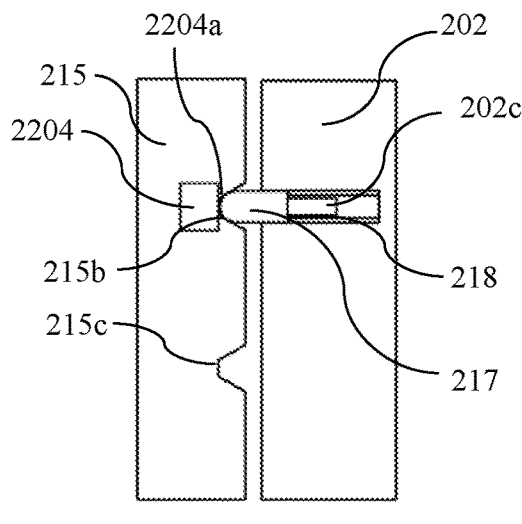
FIG. 7A
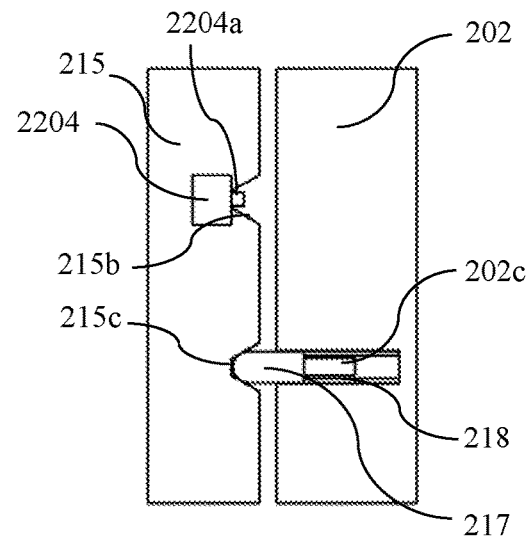
FIG. 7B

LENS APPARATUS, IMAGE PICKUP APPARATUS, CONTROL METHOD, AND STORAGE MEDIUM

BACKGROUND OF THE INVENTION

Field of the Invention

The present invention relates to a retractable lens apparatus and an image pickup apparatus having the same.

Description of the Related Art

Some lens apparatuses are so retractable that a movable part is movable in an optical axis direction relative to a fixed part. More specifically, an imaging state (extended state) is made during imaging in which the movable part projects toward the object relative to the fixed part, and a retracted state (stored state) is made during non-imaging (while the lens apparatus is carried) in which the movable part is stored in the fixed part. This lens apparatus uses a detector to detect whether or not it is in the imaging state that enables imaging.

For example, Japanese Patent Laid-Open No. 9-43655 discloses a lens apparatus that detects through a detector whether or not a front lens holding barrel extends from a rear lens holding barrel, and transmits the detection result to a camera body.

The lens apparatus disclosed in Japanese Patent Laid-Open No. 9-43655 detects that it has become in the imaging state, but does not determine whether or not it is retained (locked) to the imaging state. Therefore, the lens apparatus may move from the imaging state to the retracted state during the imaging in the unlock state.

SUMMARY OF THE INVENTION

The present invention provides a lens apparatus and an image pickup apparatus having the same, each of which can prevent the lens apparatus from moving from an imaging state to a retracted state during imaging and from capturing an image while the imaging state is unlocked.

A lens apparatus according to one aspect of the present invention includes an holding barrel configured to hold a lens, movable relative to a fixed barrel in an optical axis direction, and configured to form a retracted state having an overall length of the lens apparatus smaller than that when the lens apparatus is in an imaging state, an operating member configured to switch between a lock state that locks the holding barrel and an unlock state that unlocks the holding barrel, a state detector configured to detect a state of the holding barrel relative to the fixed barrel in the optical axis direction, a lock detector configured to detect whether the operating member is in the lock state or the unlock state, and an output unit configured to output detection results by the state detector and the lock detector, or information on whether imaging is available according to the detection results.

An image pickup apparatus having the above lens apparatus also constitutes another aspect of the present invention. A control method of the above lens apparatus also constitutes another aspect of the present invention. A computer program that enables a computer in the lens apparatus to execute the above control method also constitutes another aspect of the present invention.

Further features of the present invention will become apparent from the following description of exemplary embodiments with reference to the attached drawings.

BRIEF DESCRIPTION OF THE DRAWINGS

FIG. 6 illustrates a combination of a detecting position by a position detector, a detecting state by a lock detecting switch, and a determination of whether imaging is available in the first embodiment.

FIGS. 7A and 7B illustrate a lock state and an unlock state of a lock ring according to a second embodiment of the present invention.

DESCRIPTION OF THE EMBODIMENTS

Referring now to the accompanying drawings, a description will be given of embodiments according to the present invention.

First Embodiment

Figure 1:
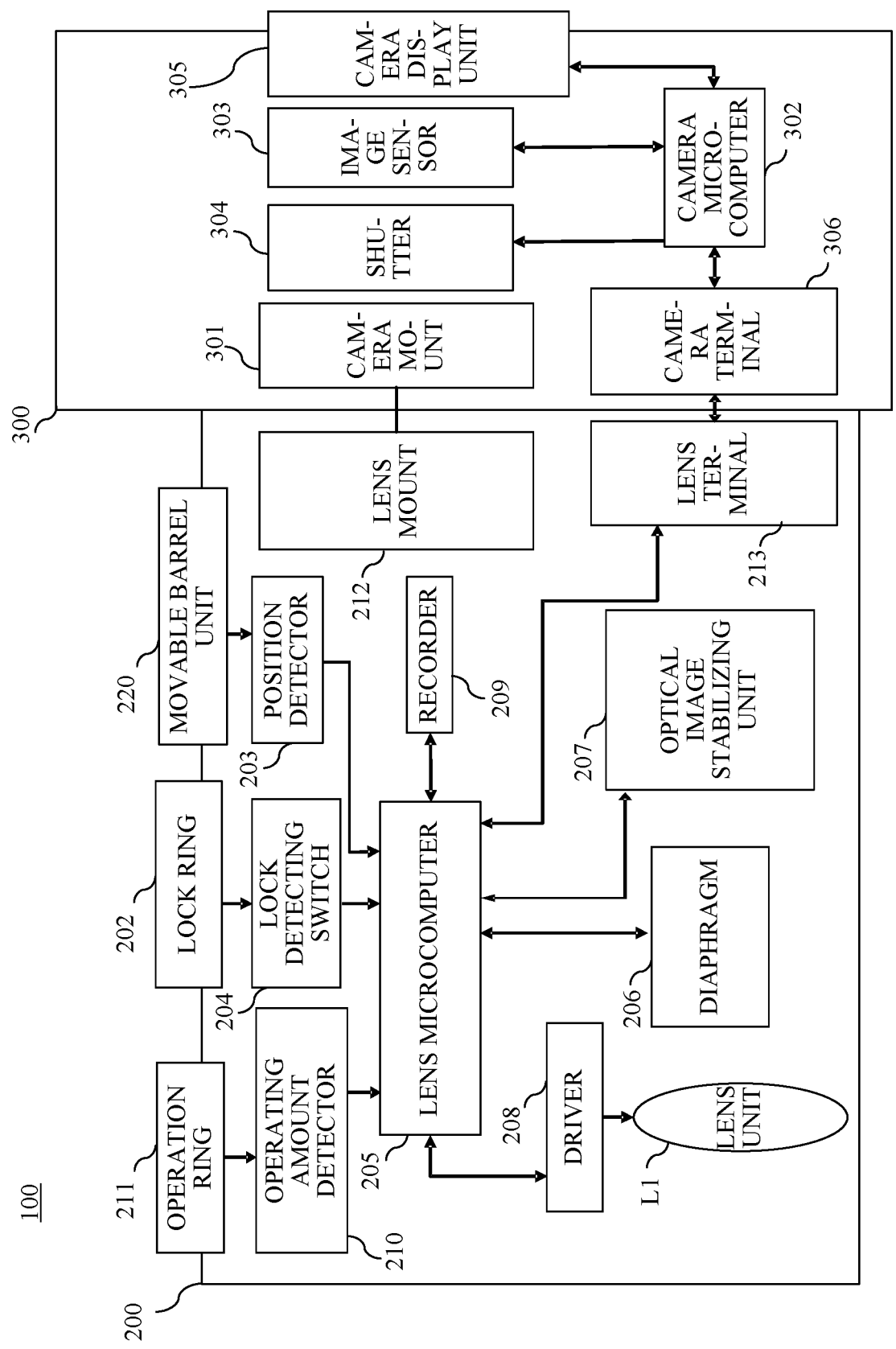
FIG. 1 is a block diagram showing a configuration of a camera system including an interchangeable lens according to a first embodiment of the present invention.
Figure 2:
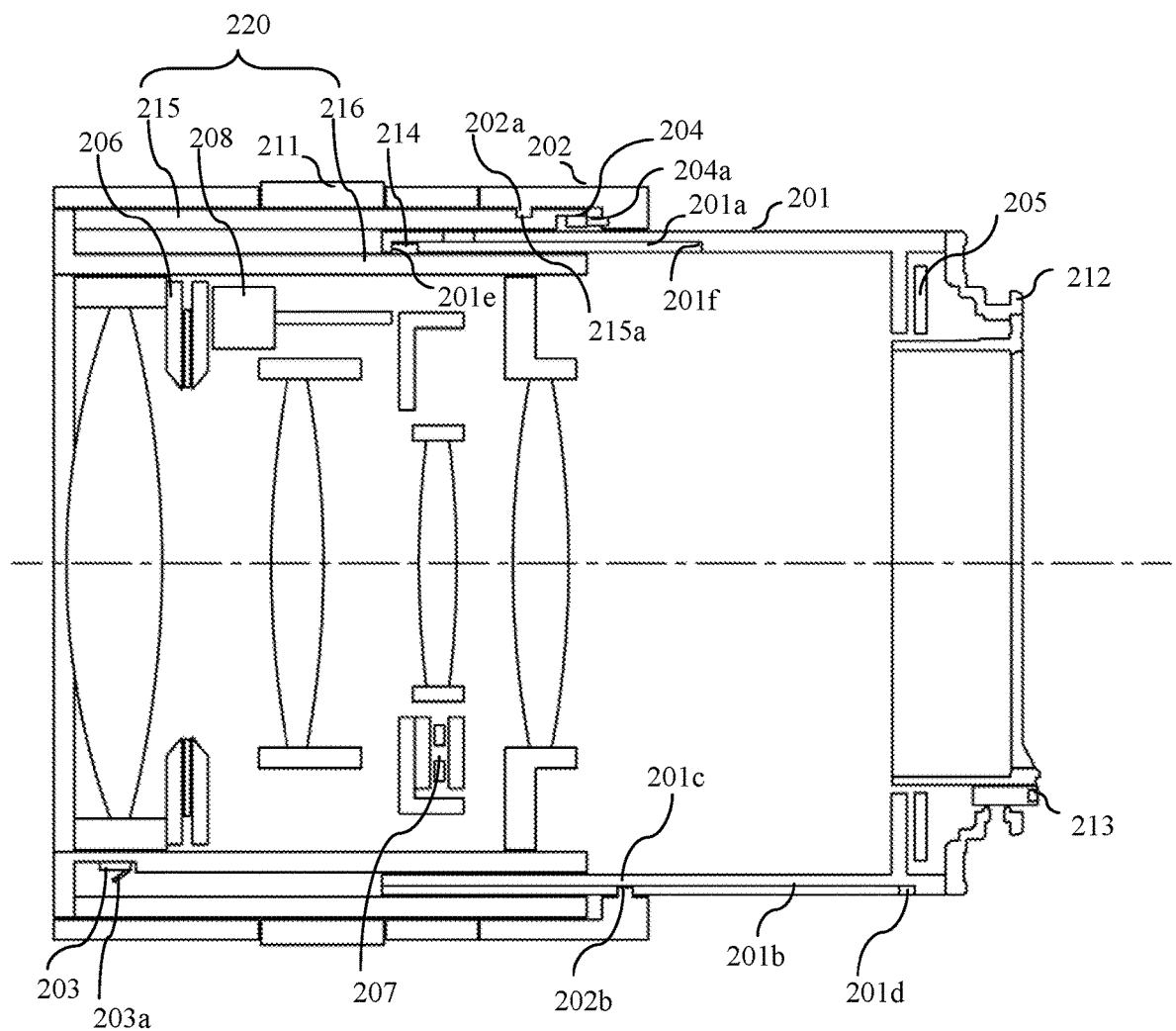
FIG. 2 is a sectional view showing an imaging state of the lens apparatus according to the first embodiment.
Figure 3:
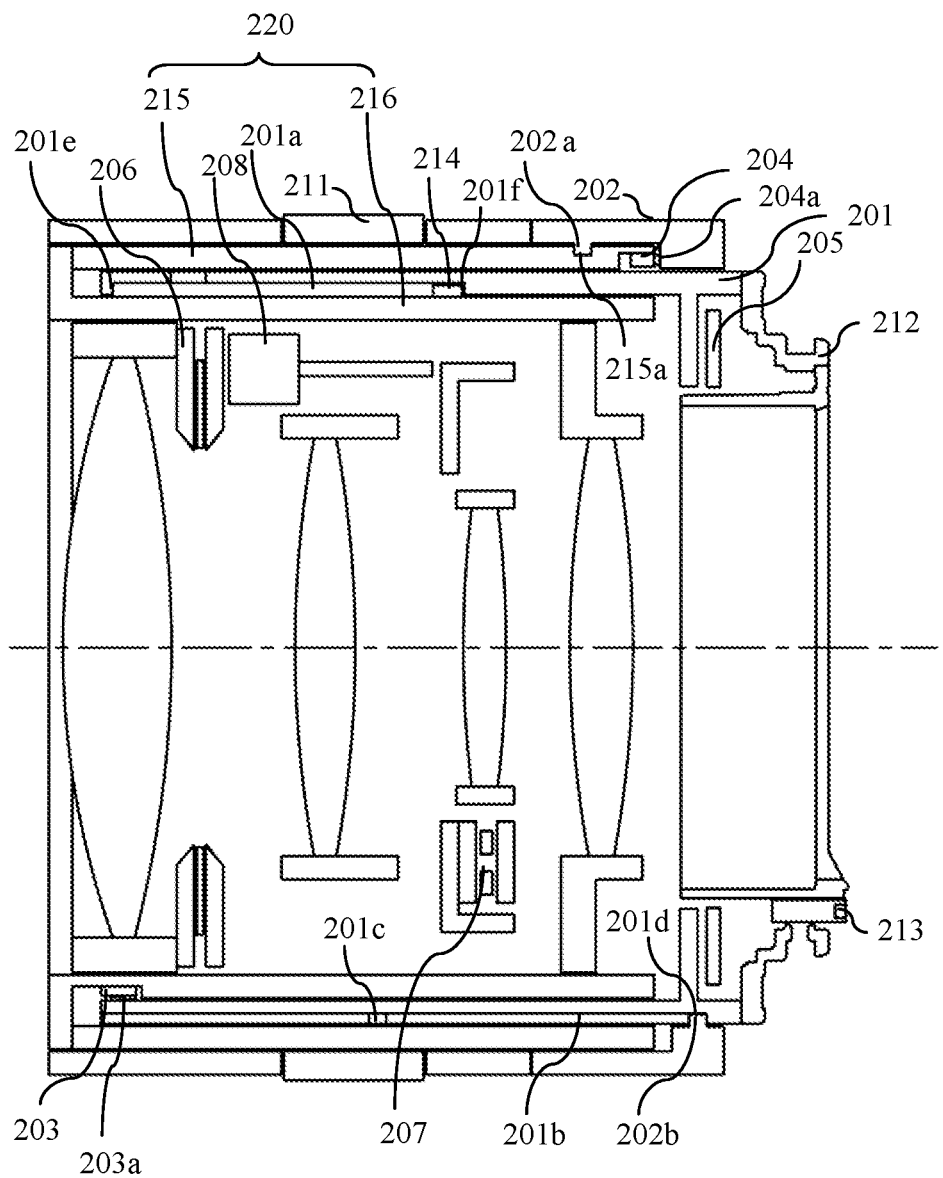
FIG. 3 is a sectional view showing a retracted state of the lens apparatus according to the first embodiment.

FIG. 1 illustrates a configuration of a camera system including an interchangeable lens 200 that serves as a lens apparatus according to a first embodiment of the present invention. FIG. 2 illustrates a section of the interchangeable lens 200 in an imaging state (shooting mode), and FIG. 3 illustrates a section of the interchangeable lens 200 in a retracted state.

As illustrated in FIG. 1, the camera system 100 includes the interchangeable lens 200 and a camera body 300 that serves as a lens interchangeable type image pickup apparatus to which the interchangeable lens 200 is detachably attached. The camera system may be a lens integrated type image pickup apparatus in which the lens apparatus and the camera body are integrated with each other.

The interchangeable lens 200 has a fixed barrel 201, a lens unit L1, a movable barrel unit 220, and a lock mechanism including a lock ring 202. As illustrated in FIG. 2, the interchangeable lens 200 is switchable between an imaging state (extended state) in which the movable barrel unit 220 extends from the fixed barrel 201 in the optical axis direction, and a retracted state (shortened state, stored state) in which the movable barrel unit 220 is retracted into the fixed barrel 201. Since the overall length of the lens is smaller in the retracted state than that in the imaging state, the retracted state is suitable for the user who carries the lens without capturing an image.

The lock ring 202 serving as an operating member can rotate in a direction around the optical axis (referred to as a circumferential direction hereinafter) centered on the optical axis of the interchangeable lens 200. The user can switch the interchangeable lens 200 between the imaging state and the retracted state by rotating the lock ring 202 from the lock position to the unlock position to move the movable barrel unit 220 relative to the fixed barrel 201 in the optical axis direction.

As illustrated in FIG. 1, the interchangeable lens 200 includes a position detector 203 that serves as a state detector, a lock detecting switch 204 that serves as a lock detector, and a lens microcomputer 205 that serves as a controller (computer, output unit). The position detector 203 is a lever type switch, and when the movable barrel unit 220 is located at the imaging position relative to the fixed barrel 201 (or when the interchangeable lens 200 is in the imaging state), a lever portion 203a is not tilted and the position detector 203 becomes in the power-off state (non-energized state). When the movable barrel unit 220 is located at the retracted position (or when the interchangeable lens 200 is in the retracted state), the lever portion 203a is tilted and the position detector 203 is in the power-on state (energized state). The power-on state and the power-off state of the position detector 203 are detected by the lens microcomputer 205. An encoder, a variable resistor, or the like may be used as the position detector 203.

The lock detecting switch 204 is a lever type switch, and when the lock ring 202 is located at the lock position (see FIG. 4A), a lever portion 204a is not tilted and the lock detecting switch 204 is in the power-off state. When the lock ring 202 is located at the unlock position (see FIG. 4A), the lever portion 204a is tilted and the lock detecting switch 204 is in the power-on state. The power-on state and the power-off state of the lock detecting switch 204 are detected by the lens microcomputer 205.

The interchangeable lens 200 includes a diaphragm (aperture stop) 206 for adjusting a light amount, an optical image stabilizing unit 207 for the image stabilization, a driver 208 for driving the lens unit L1 in the optical axis direction for zooming and focusing, such as a stepping motor, a vibration motor, and a voice coil motor. The diaphragm 206, the optical image stabilizing unit 207, and the driver 208 are controlled by the lens microcomputer 205.

The lens microcomputer 205 is a microcomputer including an MPU, a CPU, and the like, and can communicate with a recorder 209, the operating amount detector 210, the position detector 203, and the lock detecting switch 204.

An operation ring 211 can be endlessly rotated by the user in the circumferential direction. The control target controlled by the rotational operation of the operation ring 211 can be selected by the user among the lens unit L1, the diaphragm 206, the optical image stabilizing unit 207, and the like. The operating amount detector 210 outputs a signal corresponding to a rotating amount of the operation ring 211 to the lens microcomputer 205. The lens microcomputer 205 uses the signal to drive the controlled target.

The interchangeable lens 200 has a lens mount 212 as a connector that is mechanically and electrically connected to the camera mount 301 of the camera body 300. The lens mount 212 has a lens terminal 213 for communicating with the camera body 300.

The camera body 300 has an image sensor 303 and a camera microcomputer (controller) 302. The image sensor 303 includes a CCD sensor, a CMOS sensor, or the like, and captures (photoelectrically converts) an optical image formed by the interchangeable lens 200 (lens unit L1). The camera microcomputer 302 can generate image data using the imaging signal from the image sensor 303, and can display the image data on the camera display unit 305 or record it on a recording medium (not shown). In addition to the image data, the camera display unit 305 can display the state of the interchangeable lens 200, such as the optical image stabilization on and off states, the imaging and retracted states, and the like. The camera microcomputer 302 controls the imaging condition such as an ISO speed of the image sensor 303, a white balance, and a shutter speed. The shutter 304 operates in response to an instruction from the camera microcomputer 302 and controls an exposure amount of the image sensor 303. The camera microcomputer 302 communicates with the lens microcomputer 205 through the lens terminal 213 and the camera terminal 306.

As illustrated in FIGS. 2 and 3, the movable barrel unit 220 includes a holding barrel 216 and an exterior barrel 215. The holding barrel 216 holds the diaphragm 206, the optical image stabilizing unit 207, the driver 208, and the position detector 203. Since a linear guide member 214 fixed to the holding barrel 216 is engaged with a linear guide groove portion 201a provided in the fixed barrel 201 and configured to extend in the optical axis direction, the holding barrel 216 is restricted from rotating in the circumferential direction while it is guided movably relative to the fixed barrel 201 in the optical axis direction.

The exterior barrel 215 holds the lock ring 202, the operation ring 211, and the lock detecting switch 204, and is integrally fixed to the holding barrel 216 by unillustrated screws. Since a bayonet claw 202a of the lock ring 202 is engaged with a circumferential groove portion 215a provided in the exterior barrel 215 and configured to extend in the circumferential direction, the lock ring 202 is held rotatably in the circumferential direction while it is restricted from moving in the optical axis direction.

Figure 4A:
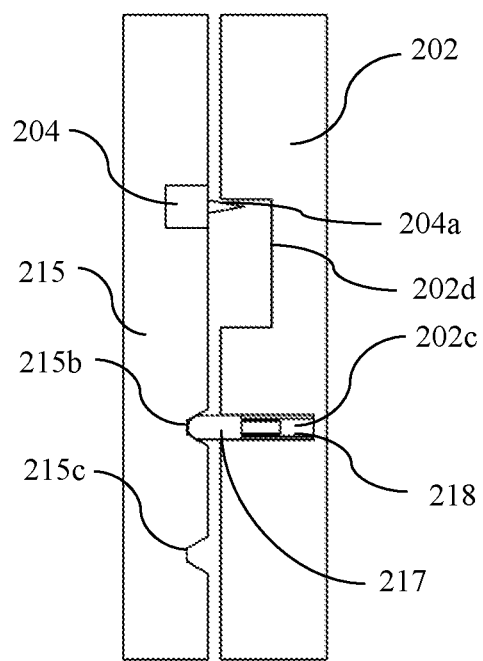
FIGS. 4A and 4B illustrate lock and unlock states of a lock ring in the first embodiment.
Figure 4B:
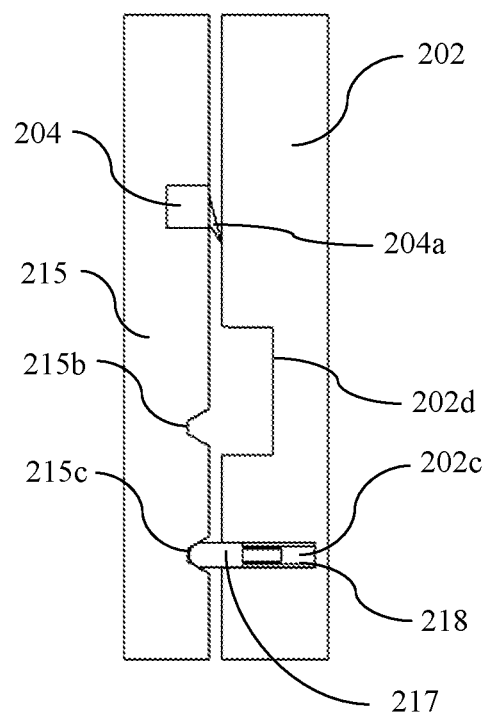

FIG. 4A illustrates the lock ring 202 located at the lock position and the exterior barrel 215, and FIG. 4B illustrates the lock ring 202 located at the unlock position and the exterior barrel 215. In FIG. 4A, the lever portion 204a of the lock detecting switch 204 is located in the groove portion 202d of the lock ring 202 and is not tilted (or rises). At this time, the lock detecting switch 204 is in the power-off state, and the lens microcomputer 205 determines that the lock ring 202 is located at the locked position.

A click pin 217 and a click spring 218 in the click mechanism are arranged and held in a hole 202c in the lock ring 202. The click spring 218 urges the click pin 217 to bring it into contact with the exterior barrel 215. The click pin 217 is inserted into a first click groove portion 215b in the exterior barrel 215 to give a click feeling to the user who rotates the lock ring 202. The lock ring 202 is retained at the lock position since the click pin 217 is engaged with the first click groove portion 215b.

In FIG. 4B, the lever portion 204a of the lock detecting switch 204 goes out of the groove portion 202d of the lock ring 202 and falls down (or tilts). At this time, the lock detecting switch 204 is in the power-on state, and the lens microcomputer 205 determines that the lock ring 202 is located at the unlock position. The click pin 217 is inserted into a second click groove portion 215c in the exterior barrel 215 to provide a click feeling to the user who rotates the lock ring 202. The lock ring 202 is retained at the unlock position since the click pin 217 is engaged with the second click groove portion 215c.

Figure 5:
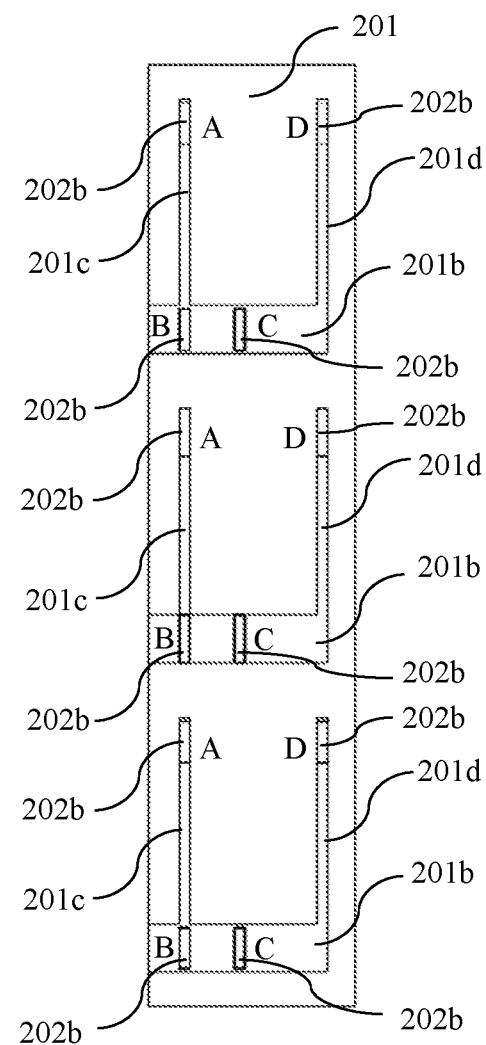
FIG. 5 schematically illustrates a relationship between the lock ring and a fixed barrel in the first embodiment.

FIG. 5 illustrates a relationship between the lock ring 202 and the fixed barrel 201. FIG. 6 illustrates a determination result of whether imaging is available (imageability determination result) by the lens microcomputer 205 according to the combination of the detection result by the position detector 203 and the detection result by the lock detecting switch 204. The lens microcomputer 205 executes imageability determination processing (control method) according to a computer program.

When a lock claw 202b of the lock ring 202 is engaged with a first circumferential groove portion 201c in the fixed barrel 201, the movable barrel unit 220 (holding barrel 216, exterior barrel 215, and lock ring 202) is restricted from moving relative to the fixed barrel 201 in the optical axis direction. Where the lock claw 202b is located at a position A in FIG. 5, as illustrated in FIG. 4A, the lock detecting switch 204 is in the power-off state since the lever portion 204a does not fall down. In the position detector 203, the lever portion 203a is not tilted and powered off. At this time, the lens microcomputer 205 determines that imaging is available because the interchangeable lens 200 is in the imaging state and the lock mechanism is in the lock state, and transmits (outputs) the determination result (information indicating that imaging is available as the information on whether the imaging is available) to the camera microcomputer 302.

When the lock ring 202 is rotated in the circumferential direction by the user from the state where the lock claw 202b is located at the position A and the lock claw 202b is moved to a position B in FIG. 5 outside the first circumferential groove portion 201c, the movable barrel unit 220 becomes movable in the optical axis direction relative to the fixed barrel 201. In this state, as illustrated in FIG. 4B, the lock detecting switch 204 is in the power-on state since the lever portion 204a is tilted. The position detector 203 remains in the power-off state in which the lever portion 203a does not fall. At this time, the lens microcomputer 205 determines that imaging is unavailable because the interchangeable lens 200 is in the imaging state but the lock mechanism is in the unlock state, and transmits (outputs) the determination result (information indicating that imaging is unavailable as the information on whether the imaging is available) to the camera microcomputer 302.

When the movable barrel unit 220 moves from the imaging position to an intermediate position in front of the retracted position relative to the fixed barrel 201 from the state where the lock claw 202b is located at the position B to a state where the lock claw 202b is located at a position C in FIG. 5, the lock detecting switch 204 remains in the power-on state in which the lever portion 204a is tilted, and the position detector 203 is in the power-on state in which the lever portion 203a is tilted, as illustrated in FIG. 4B. When the lock claw 202b is located at the position C, the lock claw 202b is engaged with the rotation restricting groove portion 201b of the fixed barrel, and the lock ring 202 is restricted from rotating in the circumferential direction. At this time, the lens microcomputer 205 determines that imaging is unavailable because the interchangeable lens 200 is not in the imaging state and the lock mechanism is in the unlock state, and transmits (outputs) the determination result (information indicating that imaging is unavailable) to the camera microcomputer 302.

When the lock claw 202b moves to the position D in FIG. 5 and is engaged with the second circumferential groove portion 201d in the fixed barrel 201, the movable barrel unit 220 is restricted from moving in the optical axis direction relative to the fixed barrel 201. The rotational operation direction of the lock ring 202 when the lock claw 202b is moved from a position outside of the second circumferential groove portion 201d to a position D is the same as the rotational operation direction of the lock ring 202 when the lock claw 202b is moved from a position outside the first circumferential groove portion 201c (position B) to the position A.

In this state, as illustrated in FIG. 4A, the lock detecting switch 204 is in the power-off state since the lever portion 204a does not fall down. In the position detector 203, the lever portion 203a is tilted and it becomes in the power-on state. At this time, the lens microcomputer 205 determines that imaging is unavailable because the interchangeable lens 200 is in the retracted state and the lock mechanism is in the lock state, and transmits (outputs) the determination result (information indicating that imaging is unavailable) to the camera microcomputer 302.

The camera microcomputer 302 that has received the determination result that the imaging is available from the lens microcomputer 205 allows the image sensor 303 to capture an image. On the other hand, the camera microcomputer 302 that has received the determination result that the imaging is unavailable from the lens microcomputer 205 restricts the image sensor 303 from capturing an image.

As illustrated in FIG. 6, when determining that imaging is unavailable, the lens microcomputer 205 can display a warning or a message on the camera display unit 305 through the camera microcomputer 302. At this time, the display content on the camera display unit 305 can be changed according to the detection result by the position detector 203 and the detection result by the lock detecting switch 204. For example, a message prompting the interchangeable lens 200 to be in the imaging state is displayed.

The thus configured interchangeable lens 200 transmits (outputs) the determination result that imaging is available to the camera body 300 (camera microcomputer 302) only when the interchangeable lens 200 is in the imaging state and the lock mechanism is in the lock state, and otherwise transmits (outputs) the determination result that imaging is unavailable to the camera body 300. This configuration can prevent the user from accidentally moving the interchangeable lens 200 from the imaging state to the retracted state during imaging. It can prevent the camera body 300 from capturing an image when the interchangeable lens 200 is in the imaging state but the lock mechanism is in the unlock state. As the information on whether the imaging is available, the power-on state and the power-off state of the lock detecting switch 204 and the position of the movable barrel unit 220 detected by the position detector 203 may be transmitted to the camera body 300.

Since the interchangeable lens 200 can be retained in the imaging state and the retracted state only by operating the lock ring 202, the operability of the interchangeable lens 200 can be improved.

The operability can be further improved by making equal to each other the rotational operation direction of the lock ring 202 for setting the lock mechanism from the lock state to the unlock state in the imaging state and that in the retracted state.

The above click mechanism can make the user who rotates the lock ring 202 clearly recognize that the lock ring 202 is in the lock or unlock state, and can prevent the lock ring 202 from inadvertently rotating from the lock state or the unlock state. Since the click groove portions 215b and 215c are provided at a position where the lock detecting switch 204 is in the power-off state and a position where the movable barrel unit 220 is movable in the optical axis direction, respectively, the operability can be further improved.

In this embodiment, the lens microcomputer 205 transmits (outputs) the information on whether the imaging is available to the camera microcomputer 302, but the lens microcomputer 205 may transmit (output) the detection results by the lock detecting switch 204 and the position detector 203 to the camera microcomputer 302, and determine whether or not imaging is available (whether the imaging is to be allowed or restricted) according to these detection results.

In this embodiment, the lock detecting switch 204 is a lever type switch, but another detector may be used, such as a push type switch or a photo-interrupter.

A relationship between the combination of the position determination result by the position detector 203 and the electrification (energization) state of the lock detecting switch 204 and the determination result of the imageability by the lens microcomputer 205 illustrated in FIG. 6 is merely illustrative, and another relationship may be adopted.

In this embodiment, the lock ring 202 as the operating member is rotated to switch between the lock state and the unlock state, but the lock member may be slid to switch between the lock state and the unlock state.

Second Embodiment

Next follows a description of an interchangeable lens according to a second embodiment of the present invention. In this embodiment, those elements, which are corresponding elements in the first embodiment, will be designated by the same reference numerals as those in the first embodiment, and a description thereof will be omitted.

FIG. 7A illustrates the lock ring 202 located at the lock position and the exterior barrel 215, and FIG. 7B illustrates the lock ring 202 located at the unlock position and the exterior barrel 215. In this embodiment, a lock detecting switch 2204 is disposed in the same phase as that of the first click groove portion 215b of the exterior barrel 215. The lock detecting switch 2204 is a push type switch and has a button portion 2204a.

In the lock state in FIG. 7A, the click pin 217 urged by the click spring 218 retained in the hole 202c in the lock ring 202 is inserted into the first click groove portion 215b in the exterior barrel 215. In this state, the button portion 2204a of the lock detecting switch 2204 is pushed (contacted) by the click pin 217, and the lock detecting switch 2204 is in the power-on state. Therefore, the lens microcomputer 205 determines that the lock ring 202 is located at the lock position (that the lock mechanism is in the lock state).

In the unlock state in FIG. 7B, the click pin 217 is inserted into the second click groove portion 215c in the exterior barrel 215. In this state, the button portion 2204a of the lock detecting switch 2204 is not pushed in, and the lock detecting switch 2204 is in the power-off state. Therefore, the lens microcomputer 205 determines that the lock ring 202 is located at the unlock position (that the lock mechanism is in the unlock position).

This embodiment disposes the lock detecting switch 2204 in the same phase as that of the first click groove portion 215b, and can make equal to each other a timing when the click pin 217 is inserted into the first click groove portion 215b to provide a click feeling and a timing when the lock detecting switch 2204 switches from the power-off state to the power-on state. Thereby, when the user rotates the lock ring 202, the display of the camera display unit 305 can be prevented from switching before the click pin 217 is inserted into the first click groove portion 215b and a click feeling is provided, and thus the operability of the interchangeable lens can be further improved.

This embodiment uses a push type switch for the lock detecting switch, but a structure such that an electrode provided in the click groove portion is in the power-on state when the click pin is inserted into the click groove portion may switch the lock detecting pin between the power-on state and the power-off state.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can prevent the lens apparatus from shifting from the imaging state to the retracted state during imaging. In addition, each embodiment can prevent imaging when the lens apparatus is in the imaging state but the lock mechanism is in the unlock state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-059849, filed on Mar. 30, 2020 which is hereby incorporated by reference herein in its entirety.

What is claimed is:
1. A lens apparatus comprising:
   a holding barrel configured to hold a lens, movable relative to a fixed barrel in an optical axis direction, and configured to form a retracted state having an overall length of the lens apparatus smaller than that when the lens apparatus is in an imaging state;
   an operating member configured to be operable to switch between a lock state that locks the holding barrel and an unlock state that unlocks the holding barrel, the operating member being operable to switch between the lock and unlock states both in the retracted state and in the imaging state;
   a state detector configured to detect a state of the holding barrel relative to the fixed barrel in the optical axis direction;
   a lock detector configured to detect whether the operating member is in the lock state or the unlock state; and
   an output unit configured to output detection results by the state detector and the lock detector, or information on whether imaging is available according to the detection results.
2. The lens apparatus according to claim 1, wherein an operating direction of the operating member for switching the operating member from the unlock state to the lock state when the lens apparatus is in the imaging state is the same as that when the lens apparatus is in the retracted state.

3. The lens apparatus according to claim 1, further comprising a click mechanism configured to provide a click feeling when the operating member is operated to each of positions corresponding to the lock state and the unlock state.

4. The lens apparatus according to claim 3,
wherein the click mechanism includes a click pin and a click groove portion into which the click pin is inserted when the operating member is operated to each of the positions corresponding to the lock state and the unlock state, and
wherein the lock detector detects whether the operating member is operated to the position corresponding to the lock state or the unlock state based on whether the click pin inserted into the click groove portion contacts the lock detector.

5. The lens apparatus according to claim 1, wherein the state detector detects that the lens apparatus is in the retracted state.

6. The lens apparatus according to claim 1, wherein the state detector detects that the lens apparatus is in the imaging state.

7. The lens apparatus according to claim 1, wherein the output unit is configured to output the detection results or the information corresponding to the lock and unlock states in the imaging state and to the lock and unlock states in the retracted state.

8. The lens apparatus according to claim 1,
wherein the operating member includes one of a protruding portion and a groove portion, and the holding barrel includes the other of the protruding portion and the groove portion, and
wherein engagement of the protruding portion and the groove portion in the lock state restricts movement of the holding member in the optical axis direction.

9. The lens apparatus according to claim 1,
wherein the operating member includes one of a protruding portion and a groove portion, and the holding barrel includes the other of the protruding portion and the groove portion, and
wherein engagement of the protruding portion and the groove portion in a middle state between the imaging state and the retracted state restricts operation of the operating member.

10. An image pickup apparatus comprising:
a lens apparatus; and
an image sensor configured to capture an optical image formed by the lens apparatus,
wherein the lens apparatus includes:
a holding barrel configured to hold a lens, movable relative to a fixed barrel in an optical axis direction, and configured to form a retracted state having an overall length of the lens apparatus smaller than that when the lens apparatus is in an imaging state;
an operating member configured to be operable to switch between a lock state that locks the holding barrel and an unlock state that unlocks the holding barrel, the operating member being operable to switch between the lock and unlock states both in the retracted state and in the imaging state;
a state detector configured to detect a state of the holding barrel relative to the fixed barrel in the optical axis direction;
a lock detector configured to detect whether the operating member is in the lock state or the unlock state; and
an output unit configured to output detection results by the state detector and the lock detector, or information on whether imaging is available according to the detection results.

11. The image pickup apparatus according to claim 10, further comprising a controller configured to allow or limit imaging according to the detection results received from the lens apparatus or the information on whether the imaging is available.

12. A control method of a lens apparatus that includes a holding barrel configured to hold a lens, movable relative to a fixed barrel in an optical axis direction, and configured to form a retracted state having an overall length of the lens apparatus smaller than that when the lens apparatus is in an imaging state, and an operating member configured to be operable to switch between a lock state that locks the holding barrel and an unlock state that unlocks the holding barrel, the operating member being operable to switch between the lock and unlock states both in the retracted state and in the imaging state, the control method comprising the steps of:
making the lens apparatus detect a state of the holding barrel relative to the fixed barrel in the optical axis direction;
making the lens apparatus detect whether the operating member is in the lock state or the unlock state; and
making the lens apparatus output detection results of the holding barrel and the operating member, or information on whether imaging is available according to the detection results.

13. A non-transitory computer-readable storage medium storing a computer program that enables a computer of a lens apparatus to execute the control method according to claim 12, the lens apparatus including an holding barrel configured to hold a lens, movable relative to a fixed barrel in an optical axis direction, and configured to form a retracted state having an overall length of the lens apparatus smaller than that when the lens apparatus is in an imaging state, and an operating member configured to be operable to switch between a lock state that locks the holding barrel and an unlock state that unlocks the holding barrel, the operating member being operable to switch between the lock and unlock states both in the retracted state and in the imaging state.

* * * * *